United States Patent
Beisel et al.

(10) Patent No.: US 8,374,177 B2
(45) Date of Patent: Feb. 12, 2013

(54) NETWORK ELEMENT FOR SWITCHING TIME DIVISION MULTIPLEX SIGNALS

(75) Inventors: Werner Beisel, Ludwigsburg (DE); Christian Hermsmeyer, Eckental (DE); Joerg Pleickhardt, Heroldsberg (DE)

(73) Assignee: Alcatel Lucent, Paris (FR)

( * ) Notice: Subject to any disclaimer, the term of this patent is extended or adjusted under 35 U.S.C. 154(b) by 474 days.

(21) Appl. No.: 12/592,796

(22) Filed: Dec. 3, 2009

(65) Prior Publication Data

US 2010/0157994 A1 Jun. 24, 2010

(30) Foreign Application Priority Data

Dec. 19, 2008 (EP) .................................... 08172422

(51) Int. Cl.
*H04L 12/28* (2006.01)
*H04L 12/56* (2006.01)
(52) U.S. Cl. ........................................................ 370/389
(58) Field of Classification Search .................. None
See application file for complete search history.

(56) References Cited

U.S. PATENT DOCUMENTS

| | | | |
|---|---|---|---|
| 5,898,688 | A | 4/1999 | Norton et al. |
| 6,714,537 | B1 | 3/2004 | Adam et al. |
| 6,829,248 | B1 | 12/2004 | Metzger et al. |
| 7,286,566 | B1 | 10/2007 | Parruck et al. |
| 2005/0141568 | A1* | 6/2005 | Kwak et al. ............... 370/539 |

FOREIGN PATENT DOCUMENTS

| | | |
|---|---|---|
| EP | 1 094 641 | 4/2001 |
| WO | WO 93/05596 | 3/1993 |
| WO | WO 03/013061 | 2/2003 |

* cited by examiner

*Primary Examiner* — Chirag Shah
*Assistant Examiner* — Minh-Trang Nguyen
(74) *Attorney, Agent, or Firm* — Carmen Patti Law Group, LLC

(57) ABSTRACT

In order to provide a network element for switching time-division multiplex signals in a transport network, which allows higher capacity at moderate equipment costs, the network element has a number of input ports (I; IO1-IO8), a number of output ports (O; IO1-IO8) and a switch fabric ( ) SF; 58) interconnecting the input and output ports (IO1-IO8). The switching fabric ( ) SF; 58) is a cell based switch comprising one or more switch modules ( ) SE1-SEn) which are adapted to switch fixed-length cells on the basis of addresses contained in cell headers of the cells. The input ports (I) contain a segmentation device (11) for segmenting an input time-division multiplex signal into fixed-length cells and assigning address information to each cell. The output ports (O) contain a reassembly device (14) for reassembling cells received from said switch fabric (SF; 58) into an output time-division multiplex signal. The address information contains a fabric address (H1, H2) and a TDM address (P0, P1). The switch fabric switches the cells in accordance with the fabric address (H1, H2) to a corresponding output port (O) and the reassembly device (14) reassembles the cells in accordance with the TDM address (P0, P1).

9 Claims, 5 Drawing Sheets

NETWORK ELEMENT FOR SWITCHING TIME DIVISION MULTIPLEX SIGNALS

The invention is based on a priority application EP 08172422.1 which is hereby incorporated by reference.

FIELD OF THE INVENTION

The present invention relates to the field of telecommunications and more particularly to a network element and related method for switching time-division multiplex signals in a transport network.

BACKGROUND OF THE INVENTION

While packet switched services are currently on the rise, transport networks today still rely mainly on circuit switched technology such as SDH (Synchronous Digital Hierarchy), where constant rate transport signals transport time-division multiplexed subrate signals. Payload signals are mapped into multiplex units, which in SDH are termed virtual containers. A multiplex unit represents an end-to-end path through the network and connections in the network are established by configuring the network elements to semi-permanently switch the corresponding multiplex unit, which is present at the same relative position in all consecutive transport frames, along that path.

Network elements are for example add/drop multiplexers and digital crossconnects. Such network elements contain I/O (input/output) ports and a switch matrix interconnecting the I/O ports. The switch function which needs to be performed on the level of multiplex units to establish paths in the network encompasses switching in both, space and time domain, i.e. between different I/O ports and between different timeslot positions. Typically, the transport signals are retimed and aligned at the input port and the switch function is performed on time slots of the aligned signal in synchronism with a common system clock in accordance with a pre-configured interconnection map.

SUMMARY OF THE INVENTION

With the ever increasing traffic demand in today's networks, a need exists for network elements which can switch a high number of traffic signals at a time. On the other hand, network elements shall be cheap and compact and shall have a low power consumption.

Network elements today are constructed using specialized integrated circuits for I/O and switching functions. While semiconductor technology typically allows higher integration for each technology generation, the evolution of a network element towards higher capacity and integration requires a complete redesign of its integrated circuits. Since such network elements are highly specialized equipment, which are manufactured at only moderate quantities, such redesign contributes substantially to high equipment costs.

It is therefore an object of the present invention, to provide a network element and related method of switching time-division multiplex signals in a transport network, which allows higher capacity at moderate equipment costs.

These and other objects that appear below are achieved by a network element for switching time-division multiplex signals which has a number of input ports, a number of output ports and a switch fabric interconnecting the input and output ports. The switching fabric is a cell based switch comprising one or more switch modules which are adapted to switch fixed-length cells on the basis of addresses contained in cell headers of the cells. The input ports contain a segmentation device for segmenting an input time-division multiplex signal into fixed-length cells and assigning address information to each cell. The output ports contain a reassembly device for reassembling cells received from said switch fabric into an output time-division multiplex signal. The address information contains a fabric address and a TDM address. The switch fabric switches the cells in accordance with the fabric address to a corresponding output port and the reassembly device reassembles the cells in accordance with the TDM address.

BRIEF DESCRIPTION OF THE DRAWINGS

Preferred embodiments of the present invention will now be described with reference to the accompanying drawings in which.

DETAILED DESCRIPTION OF THE INVENTION

Figure 1:
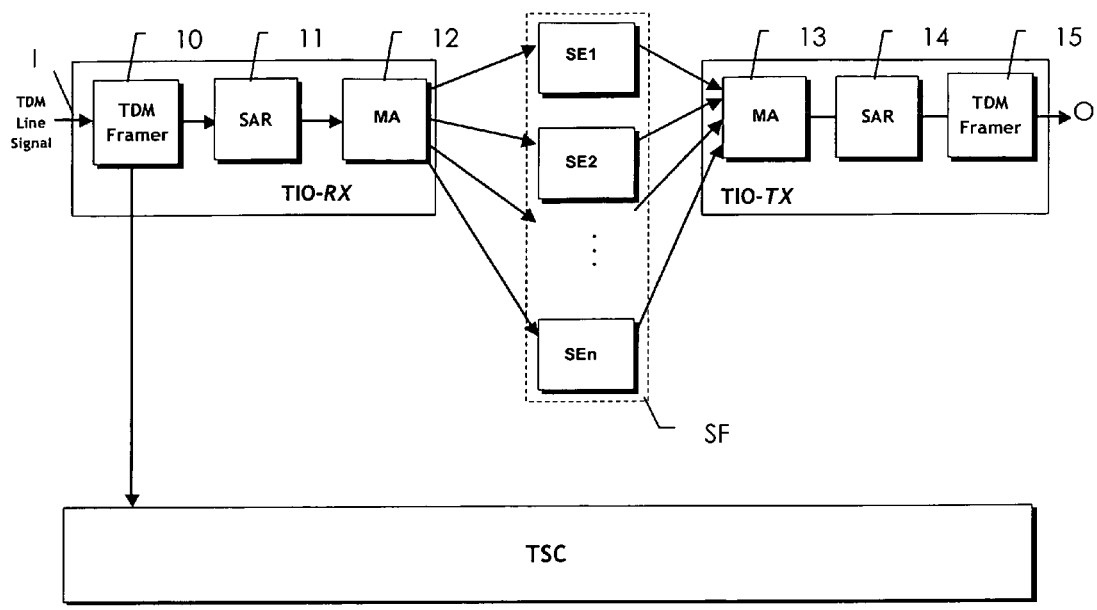
FIG. 1 shows the architecture of a network element using a cell-based switch fabric.

An embodiment of a network element is shown in FIG. 1. It contains a number of input ports and output ports. For the sake of simplicity, only one input port I is shown and only one output port O is shown. Input ports and output ports are arranged on line cards TIO. Line cards contain receiver function RX and transmitter functions TX. In the figure, only one receiver function RX-TIO and only one transmitter function TX-TIO is shown. It should be clear however, that a network element in a real application has a number of line cards, such as for example 32 line cards in a preferred embodiment. Moreover, each line card can accommodate more than one input and corresponding output ports. In a preferred embodiment, each line card has 8 input ports for 10 Gb/s TDM signals and 8 corresponding outputs ports. In total this would add up to a system capacity of 2.5 Tb/s.

The line cards are connected to a switch fabric SF, which is built from a number of switch modules SE1-SEn. These modules SE1-SEn are self-routing switch elements with full-duplex switching capacity, which support fixed sized cell switching. Such switch modules are commercially available on the market and are typically used for switching of Ethernet traffic or other kind of packet switched traffic. Such switch modules are off-the-shelf components produced in relatively large quantities. Reuse of these devices for TDM applications allows to build large network elements using newest technology with the highest level of integration at moderate price.

In the preferred embodiment having a system capacity of 2.5 Tb/s, the switch fabric SF contains 20 switch modules arranged on 5 fabric cards plus additional 12 switch modules arranged on 3 fabric boards for equipment protection purpose. Each switch module has a switch capacity of 64×64 lines at 6.25 Gb/s. It should be understood that this choice and dimensioning is just an example and could be scaled as needed and as components are available.

The line cards TIO contain a TDM framer 10, a module for a segmentation and reassembly (SAR) function 11, and a matrix adapter (MA) 12. In receive direction (ingress side), the TDM framer 10 terminates the transport overhead of received transport signals. Additionally, the framer also performs a retiming and alignment function for the received signals. The SAR module 11 extracts the multiplex units from timeslots in the received TDM signals and convert these into a cell format. The SAR module also inserts into each cell a cell header that contains address information as will be explained below. The matrix adapter 12 distributes the cells to the switch elements SE1-SEn of the switch fabric SF and contains a traffic manager for scheduling and traffic shaping. Such matrix adapters are also commercially available on the market for use in Ethernet or packet switching applications.

In addition, the network element contains a TDM shelf controller TSC, via which the Line cards can be configured as will be explained below in more detail. The shelf controller also receives overhead information terminated in the TDM framer.

The transmit side (egress side) of a line card TIO-TX is shown on the right hand side of FIG. 1. In transmit direction, a matrix adapter 13 receives cells from the switch matrix SM, orders these and feds them to a SAR module 14. The SAR module extracts the useful data from the received cells and reassembles these into multiplex units. A TDM framer 15 maps the multiplex units into newly created TDM frames for onward transmission.

As explained, signal flow in FIG. 1 is from the left to the right. A TDM line signal structured into frames of same length is received at input port I. In the embodiment, the line signal may be an STM64 signal which has a capacity of 10 Gbit/s. An STM64 frame contains 64 higher order multiplex units VC-4. Alternatively, a line signal multiplexed of 4×STM16 or 16×STM4 or combinations thereof can be used. Moreover, the SONET equivalent STS-192 can equally be used as line signal. In any case, the switching granularity is chosen as STS-1, which corresponds to ⅓ STM1. This is, however, only an internal switching entity while frame processing is done prior to the switching, so that STM1 for example can be switched as 3 independent STS-1. The actual frame processing is done by the TDM framer 10, which terminates the section overhead of the STM64 frames and processes their AU pointers.

Figure 2:
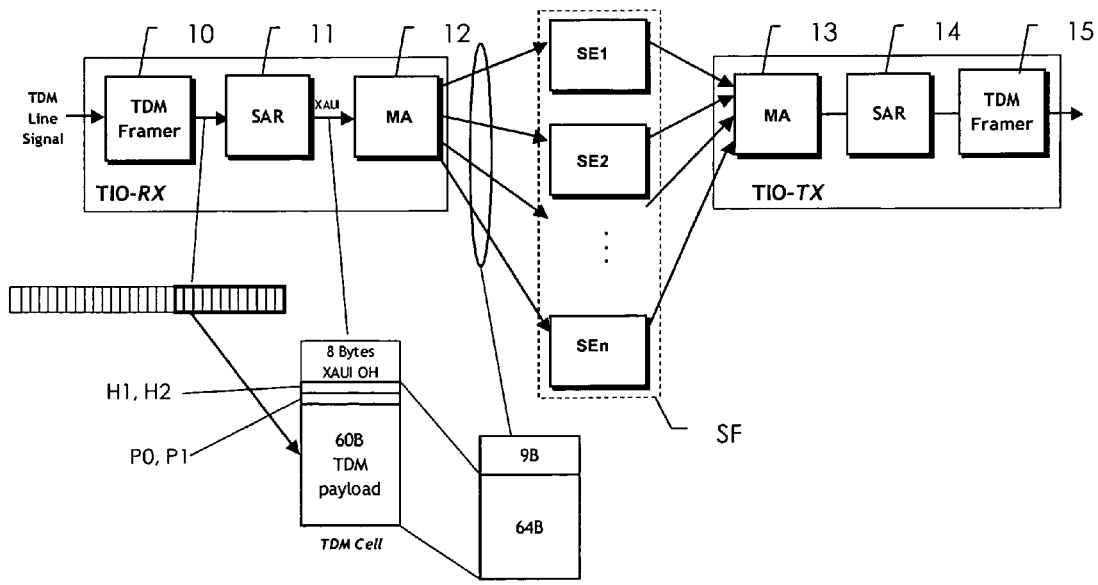
FIG. 2 shows the internal signal structure in the network element of FIG. 1.
Figure 4:
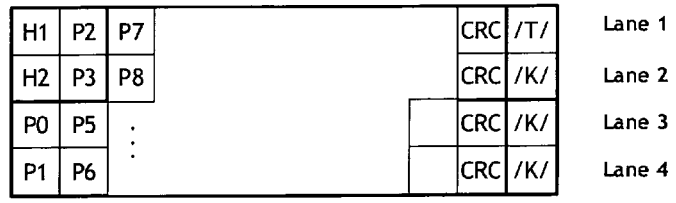
FIG. 4 shows the cell structure as transmitted over a 4 lane wide parallel interface.

The signal structure is shown schematically in FIG. 2. The output of TDM framer 10 is a continuous bitstream, still structured into frames but synchronized to a local clock and with the frame header (section overhead) extracted. The multiplex units will be found in fixed time slots within each frame. The SAR module 11 extracts the multiplex units from the time slots and converts these into a cell format by segmenting the bitstream into 60 B payload cells. The output of SAR module 11 has a cell format with 60 B payload, 4 B address overhead and an additional 8 B cell header which contains framing and CRC bytes. In the preferred embodiment, use is made of a modified XAUI interface (XAUI stands for "10 Gigabit attachment unit interface"), which is a popular inter-chip or backplane format for 10 G Ethernet applications. The XAUI interface between SAR 11 and MA 12 is a parallel interface with a width of 4 lanes. Distribution of the cell bytes over the 4 parallel lanes is shown in FIG. 4. The 8 byte XAUI cell header is located there at the end of the cell and contains CRC (cyclic redundancy check) and framing (/K/, /T/) bytes, which determine the end of the cell. It should be understood that XAUI or modifications thereof are just one possibility for the inter-chip interface and that other cell based interface formats could equally be used.

The interface between the MA 12, 13 and the switch fabric SF is a proprietary interface with a 9 byte cell header, which additionally contains a timestamp that takes care of the order of the cells at the transmit side MA 13.

Figure 3:
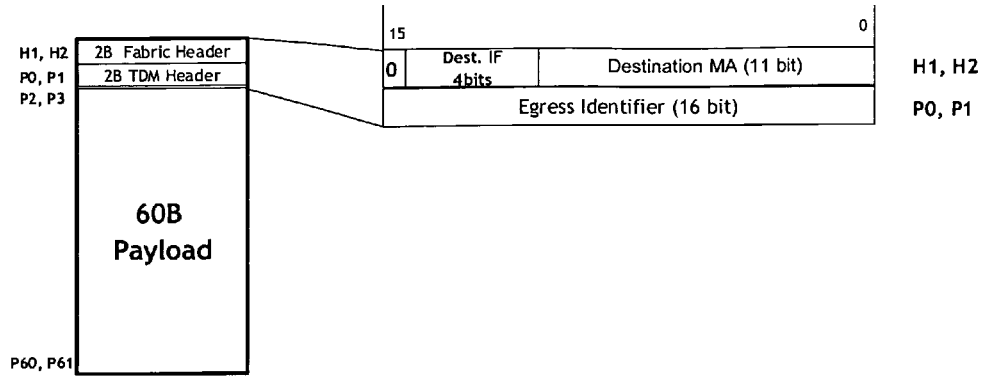
FIG. 3 shows the cell structure used in the network element of FIG. 1.

The 4 B address field, which is shown in more detail in FIG. 3, contains a 2 B fabric header and a 2 B TDM header. The fabric header is looked at by the switch fabric. It contains an address that is indicative of the output port to which the cell is going. Since each line card carries 8 output ports, the fabric header contains 11 bits which identify the destination MA and 4 bits which identify the output port served by that destination MA. The first bit is used to distinguish unicast from multicast connections as will be explained in more detail further below. In case of unicast connections, this bit is set to '0'.

The TDM header is looked at by the transmit side SAR module and contains a 16 bit egress identifier. The least significant 8 bits (P1) indicate the time slot to which the cell belongs. Since the network element in the embodiment switches in granularity of STS-1 (Synchronous Transport Signal level 1), there are 192 timeslots in a 10 G output signal (STM64 or STS-192). Hence, 8 bits are sufficient to address these ($2^8$=256). The most significant 8 bits (P0) identify the 10 G signal, to which the timeslot belongs into which the cell payload needs to be mapped. This may seem redundant in view of the information of the fabric header H1, H2, but proves useful when multicast connections are involved, for example for protection switching, to identify the signal in the system unambiguously.

Figure 5:
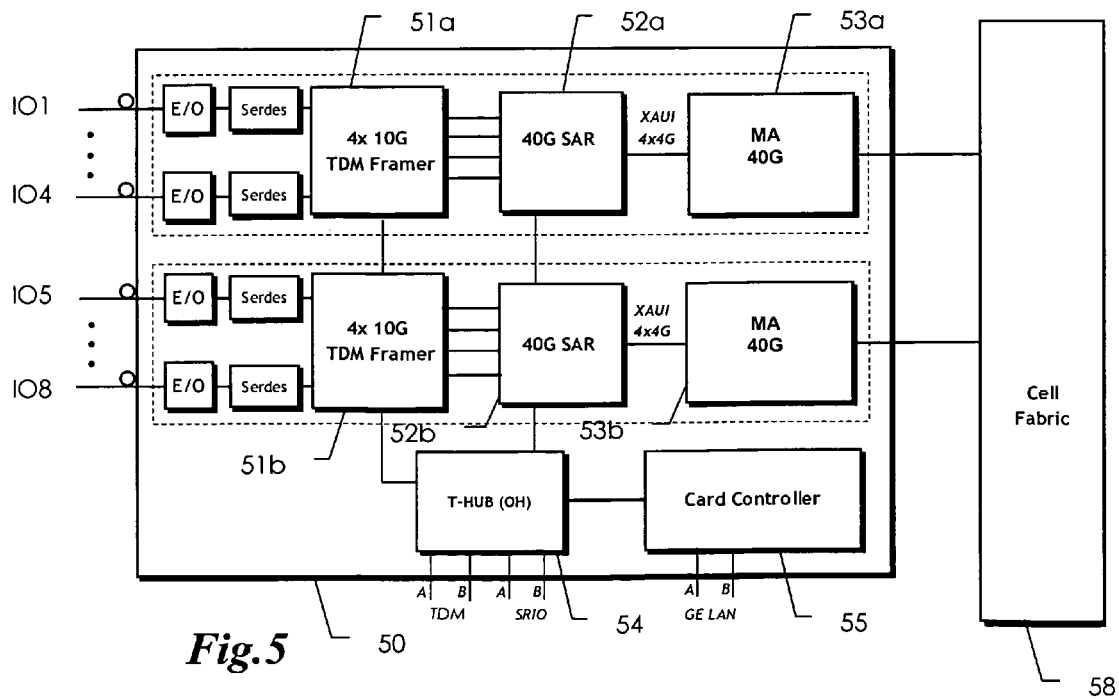
FIG. 5 shows a block diagram of a line card used in the network of FIG. 1.

A line card 50 for the network element of FIG. 1 is shown in FIG. 5. It contains 8 I/O ports IO1-IO8 for connecting optical fiber links. Each I/O port IO1-IO8 is equipped with an E/O converter (electrical/optical) connected to a Serializer/Deserializer (Serdes), which converts data between serial and parallel interfaces in each direction. The line card 50 further contains two framer circuits 51*a*, 51*b*, each framer circuit 51*a*, 51*b* serves four I/O ports and has a capacity of 4×10 G. Each of the two framer circuits 51*a*, 51*b* is connected to a SAR module 52*a*, 52*b*, which also has a capacity of 40 G, and each of the two SAR modules 52*a*, 52*b* connects to a MA 53*a*, 53*b*. The two MAs 53*a*, 53*b* each are connected via a 4 lane wide interface to the switch fabric 58. It should be noticed that all functions of the line card are bidirectional and contain receive and transmit functionality. Interconnections on the line card 50 as well as external fiber connections are shown schematically are preferably implemented as distinct physical connections for the two directions of transmission.

The line card 50 further contains a card controller 55, which is connected to the two framer circuits 51*a*, 51*b* and the SAR modules 52*a*, 52*b* via a hub circuit 54. Hub 54 serves as a bridge and interconnects different type if chip interfaces. The card controller 55 has a LAN interface (GE LAN) to the controller TSC (see FIG. 1). The hub 54 provides additional external interfaces such as a serial interface SRIO and a multiplexed TDM interface. As control interface between the integrated circuits on the line card and the hub 54 serves a compact PCI interface (cPCI).

The framer circuits 51*a*, 51*b* terminate the section overhead of received line signals and forward the control bytes via the hub 54 to the card controller 55. The card controller 55 manages and configures the line card. However, it is also possible that the shelf controller TSC manages and configures the framer and SAR modules directly via the external interface of the hub 54 and can hence take over the functions of the card controller 55, so that a line card can also be implemented without a separate card controller.

The SAR segments the timeslots from the received TDM signal into cells and assigns the fabric and TDM addresses. These have been configured by the card controller 55 or the TSC directly. The MA is a standard component for Ethernet devices and provides in cooperation with the cell based switch fabric 58 an interconnection function to the transmit side MA, which distributes received cells in accordance with the 4 destination interface bits to the appropriate output port. The MAs in receive and transmit direction and the switch fabric SF can hence be seen as a three stage switch matrix. It should be understood that depending on the system capacity such switch matrix can also have more than three stages.

Figure 6:
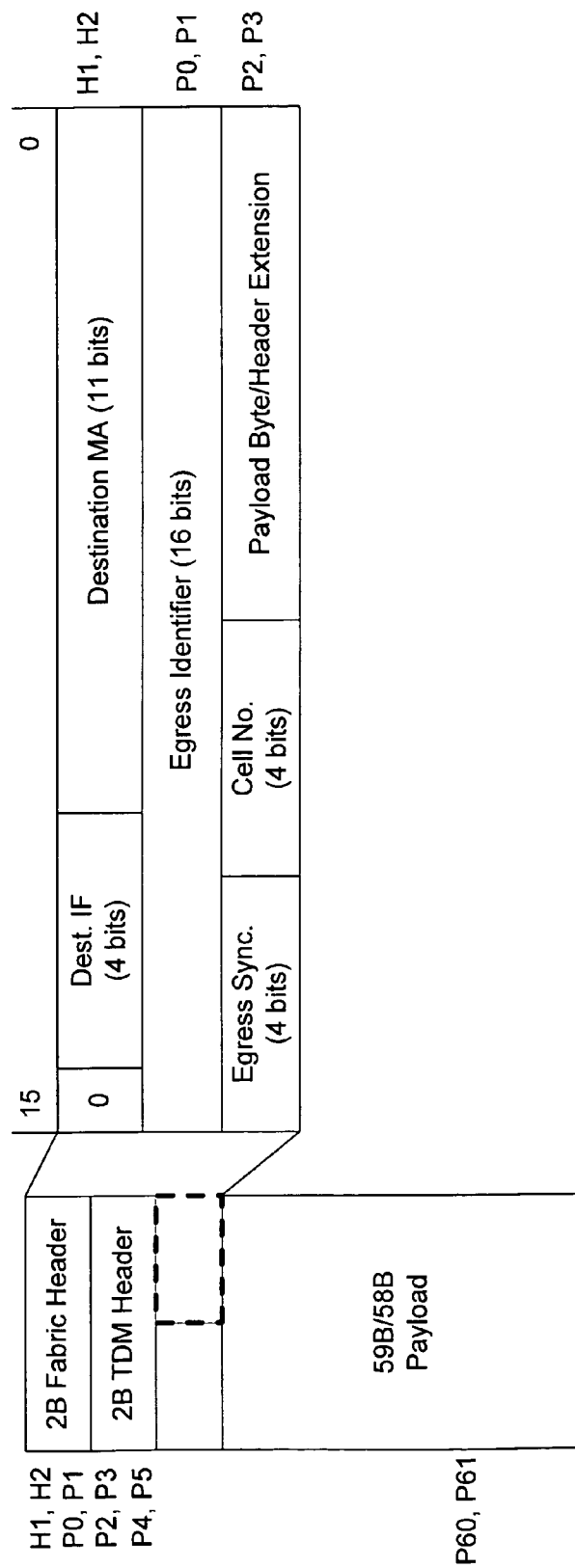
FIG. 6 shows a variant of the cell structure of FIG. 3.

FIG. 6 shows an improvement with regard to the format of the cell header. It contains an additional header byte P2. Moreover, byte P3 can be either used as payload byte or as header extension. Byte P2 has 4 bits for egress synchronization and 4 bits which indicate the cell number in a multiframe. Segmentation is performed in multiframes of 500 μs, i.e. 4 consecutive STS-1 frames.

Figure 7:
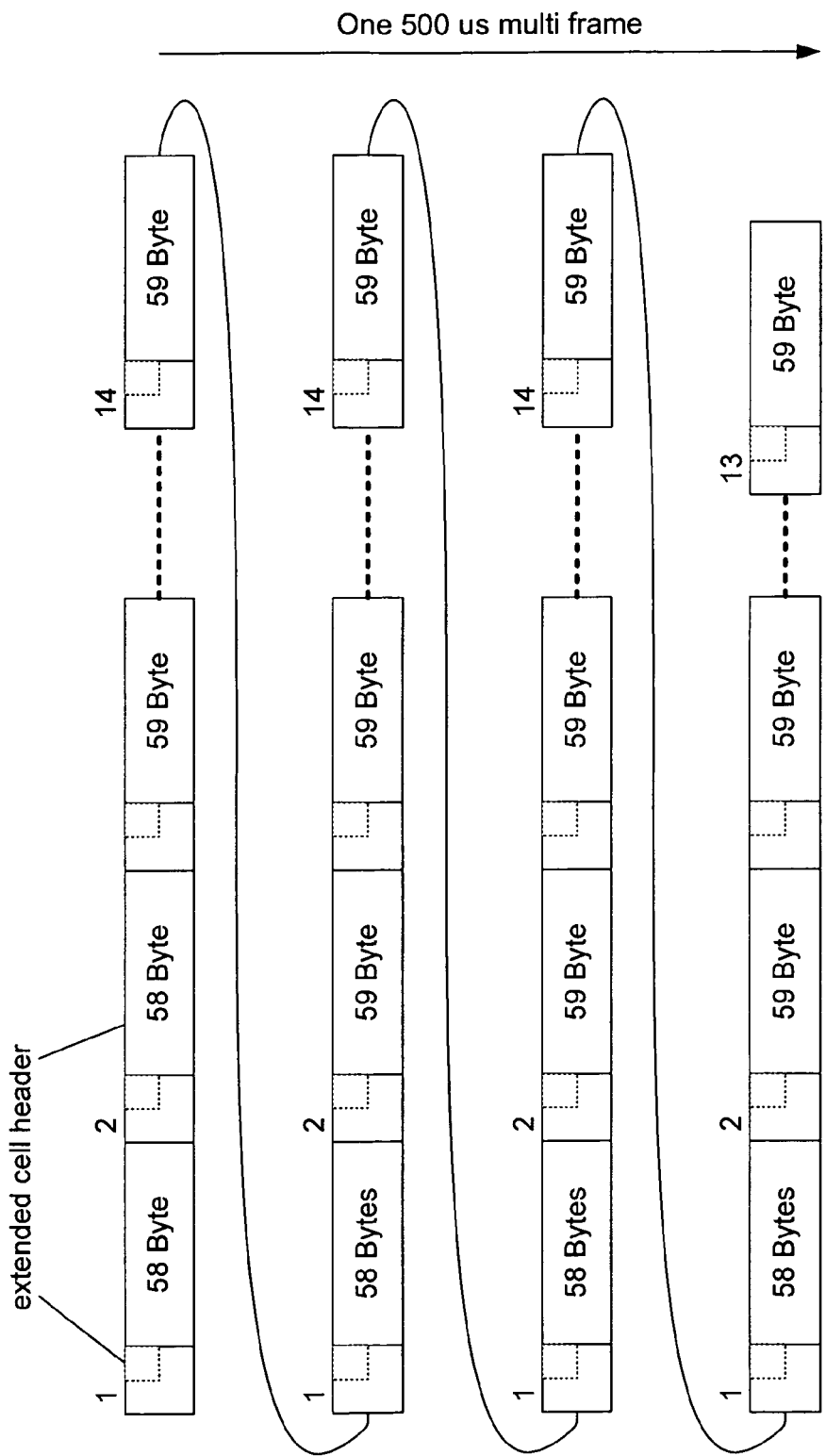
FIG. 7 shows segmentation of an STS-1 multiframe into cells having the cell structure shown in FIG. 6.

As can be seen in FIG. 5, the STS-1 transport cell format provides nominal 5 bytes for cell header and 59 bytes for payload, but there are a few cells within an STS-1 cell transport with an extended header of 6 bytes and 58 payload bytes. Complete STS-1 frames including the overhead columns 1, 2, and 3 are transported across the payload sections of an STS-1 cell transport. An STS-1 cell transport has a multi frame structure, where the very first cell within the multi frame always transports the start of an STS1 frame at a fixed cell position (P4). This cell is indicated by a marker within the egress sync section of the cell header. The duration of the accumulation interval of a multiframe within an STS-1 cell transport is 500 μs. During that time interval 4×810 bytes=3240 bytes will be transported as shown in FIG. 7.

Further to the above explained address mechanism, which allows to switch TDM sub-signals in time and space domain from one input port to one output port, the network element of the embodiment additionally provides the ability to send an input signal to more than one output ports. Such connections are termed multicast connections. For this, the fabric header H1, H2 is replaced by a 15 bit multicast address and the fabric modules SE1 to SEn and MAs are configured to switch cells carrying a certain multicast address to the appropriate output ports. Such multicast connections are primarily used for protection switching, where an input signal needs to be sent over redundant links. In case of a multicast connection, the first bit of the fabric header is set to '1'.

Figure 8:
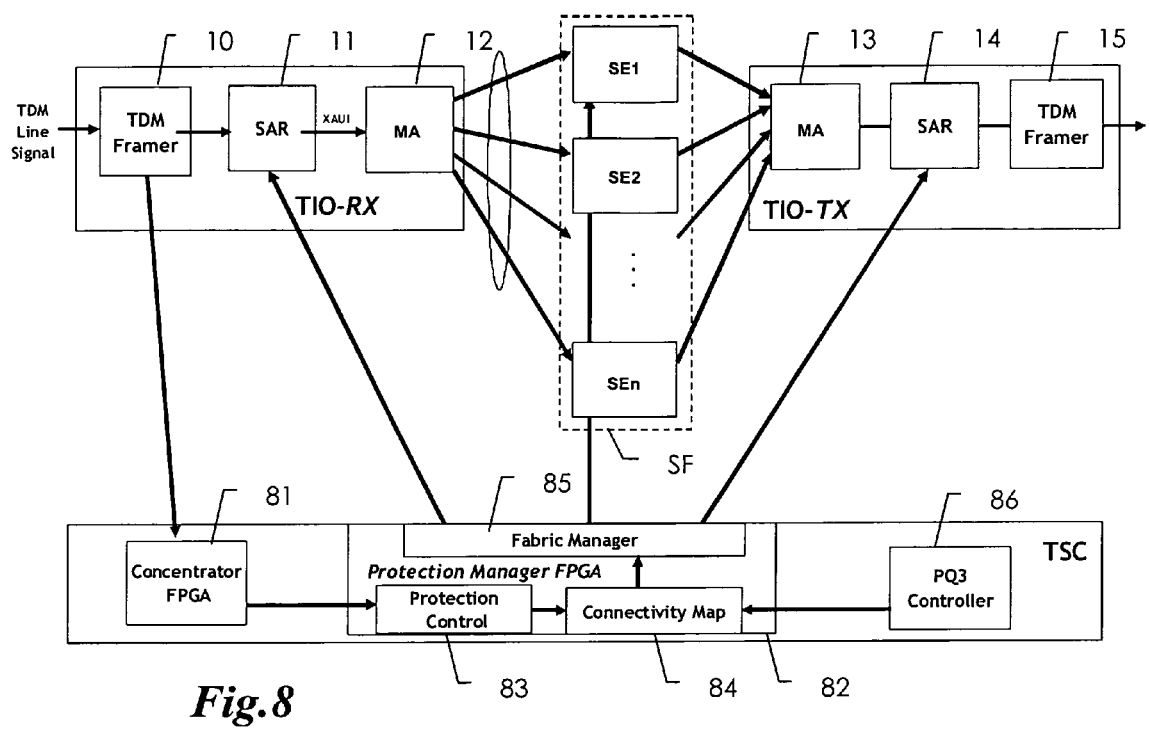
FIG. 8 shows in more detail the controller of the network element from FIG. 1 and its functioning.

Using the example of multicast switching, the functioning and design of the controller as shown in FIG. 8 will be explained in more detail. Controller TSC contains a concentrator module 81, a protection manager 82, and a communication controller 86 for communication with a data plane controller or a network management facility. These modules are preferably implemented as FPGAs (field gate programmable arrays). The protection manager 82 contains a protection control block 83; a connectivity map block 84 and a fabric manager 85, which performs the actual configuration and management of the switch functions in the network element.

In the receive side line card, framer 10 terminates the section overhead and extracts control bytes therefrom. The framer detects line and section alarms as well as alarm and status information per virtual container (VC), extracts automatic protection switching (APS) bytes K1 and K2, and determines primitives for performance monitoring (PM). These information are forwarded via the TDM interface of the hub 54 to the controller TSC and aggregated from all line cards by concentrator module 81. The protection control block 83 evaluates these data and determines when in case of a failure or signal degrade, protection switching needs to be performed and configures the connectivity map of block 84 accordingly. Connect/disconnect requests to set up new connections or disconnect an existing connection are received at communication controller 86, which configures the connection map of block 84 accordingly. The connectivity map 84 is implemented by fabric manager 85 in the following way: For any kind of connections (unicast and multicast), the fabric manager configures the receive side SAR module 11 with connection tags per STS-1, i.e. which addresses will be used per cell for each particular STS-1.

Since the switch fabric is self routing and keeps cell order, only multicast connections need to be configured through the fabric manager. This is achieved by configuring the switch elements accordingly so that these know per multicast address to which ports the respective cells need to go. Finally, the fabric manager configures the transmit side SAR module to assign multicast buffers as well as STS-1 timeslots. Since a cell with a single TDM address is sent to more than one output port and does not necessarily end into the same timeslot at these ports, it is necessary to configure the timeslots at the line cards, directly. Moreover, the buffers allow also a multicast of a single cell to more than one outputs served by the same SAR module.

Accordingly, connectivity is provided by setting the cell addresses at ingress side. The fabric header H1, H2 addresses the destination MA port and the TDM header P0, P1 addresses the STS-1 timeslot. The connectivity of the fabric is evaluated by the TDM Shelf Controller TSC and download into the segmentation and reassembly (SAR) function of the line cards. Destination headers for whole fabric are calculated taking into account path (SNCP) and line switching functions (MSP) at a rate 200 times per second (5 ms cycle). Every 5 ms the complete connectivity is downloaded into line cards and fabric devices. As mentioned, fabric devices need to be configured for multicast connectivity only.

Further to the TDM line cards, the network element can additionally be equipped with packet line cards, thus providing a real multi-service switch. Such multi-service network element allows to switch packet as well as synchronous TDM services using a single "type-agnostic" switch matrix. While traditionally, completely distinct networks were used for these two kind of traffic, implementation into a single node allows to have all kind of services within a single network architecture. This saves considerable costs as compared to hybrid network elements, which have both, a TDM matrix for TDM traffic and a cell matrix for packet traffic.

It should be clear that based on the above principles, various modifications could be envisaged to the specific embodiment.

The invention claimed is:

1. A network element for switching time-division multiplex signals comprising: a number of input ports, a number of output ports and a switch fabric interconnecting said input ports and said output ports;
   wherein said switching fabric is a cell based switch comprising one or more switch modules configured to switch fixed-length cells on the basis of addresses contained in cell headers of said cells;
   wherein said input ports comprise a segmentation device for segmenting timeslots of an input time-division multiplex signal into fixed-length cells and inserting into each cell a cell header that contains address information;

wherein said output ports comprise a reassembly device for reassembling cells received from said switch fabric into an output time-division multiplex signal;

wherein said address information contains a fabric address and a TDM address addressing a time slot of said output time-division multiplex signal;

wherein said switch fabric switches said cells in accordance with said fabric address to a corresponding output port and;

wherein said reassembly device reassembles said cells in accordance with said TDM address.

2. A network element according to claim 1, wherein the switch fabric is self-routing.

3. A network element according to claim 1, wherein said switch fabric contains a number of identical switch elements and wherein said network element further comprises at least one matrix adapter which distributes the cells to the switch elements.

4. A network element according to claim 3, wherein said matrix adapter also receives cells from said switch fabric, reorders these cells in accordance with information from headers of these cells and forwards the reordered cells to the reassembly device of the corresponding output port.

5. A network element according to claim 3, wherein one or more input ports and one or more output ports are arranged on a line card, which further contains a segmentation and reassembly module comprising the segmentation device and the reassembly device corresponding to said one or more input and output ports and the matrix adapter, and wherein said network element comprises a plurality of such line cards.

6. A network element according to claim 1, further comprising a controller, which is connected to said segmentation device and adapted to configure said segmentation device which address information to enter into each cell.

7. A network element according to claim 1 being further adapted to establish multicast connections, wherein in case of a multicast connection said fabric address is replaced by a multicast address in the cell headers and wherein said switch fabric is configured to distribute cells to the appropriate output ports based on said multicast address.

8. A network element according to claim 1, further comprising one or more packet line cards for receiving packet traffic signals and converting said packet traffic signals into fixed lengths cells.

9. A method of switching time-division multiplex signals comprising the steps of:

at an input ports of a network element, segmenting timeslots of an input time-division multiplex signal into fixed-length cells and inserting into each cell a cell header that contains address information, wherein said address information contains a fabric address and a TDM address addressing a timeslot of said output time-division multiplex signal;

switching said cells from the input port through a cell based switch fabric in accordance with said fabric address to corresponding output ports of said network element; and at said output ports, reassembling cells received from said switch fabric into output time-division multiplex signals in accordance with said TDM address.

\* \* \* \* \*